United States Patent [19]
Norman

[11] Patent Number: 4,854,199
[45] Date of Patent: Aug. 8, 1989

[54] PORTABLE BRAKE DISC RESURFACING TOOL

[75] Inventor: John S. Norman, Waukegan, Ill.

[73] Assignee: Ammco Tools, Inc., North Chicago, Ill.

[21] Appl. No.: 248,167

[22] Filed: Sep. 23, 1988

[51] Int. Cl.$^4$ .............................................. B23B 5/04
[52] U.S. Cl. ................................ 82/112; 51/281 SF; 51/132
[58] Field of Search .................. 82/2 A, 4 A, 4 E, 35, 82/39; 51/281 SF, 132

[56] References Cited

U.S. PATENT DOCUMENTS

| | | | |
|---|---|---|---|
| 3,626,793 | 12/1971 | Rice | 82/36 |
| 4,226,146 | 10/1980 | Ekman | 82/4 A |
| 4,388,846 | 6/1983 | Kopecko et al. | 82/4 A |
| 4,478,116 | 10/1984 | Fuller | 82/4 A |

Primary Examiner—Frederick R. Schmidt
Assistant Examiner—Jack W. Lavinder
Attorney, Agent, or Firm—Edmond T. Patnaude

[57] ABSTRACT

An improved portable brake disc resurfacing tool of the type which is mountable on an automobile wheel hub assembly for resurfacing brake discs without removing the disc from the automobile wheel assembly includes a generally rectangular framework having at its right hand side a frame mounting assembly including opposed arms vertically slidable on the frame and means for maintaining those arms in symmetrical positioning with respect to the frame and with respect to the brake caliper mounting assembly on which the resurfacing tool is to be mounted. The arms are also reversible in their mountings to provide added adjustability of the mounting system for varying brake disc caliper mounting members. The portable brake lathe further includes a tool mounting carriage which is slidingly retained on the framework and provides an adjustable mounting for tool holders which in turn each mount a triangular 12 point removable cutting tool thereon. The cutting tools are positioned opposed in spaced relation for use in cutting opposed side surfaces of an automobile rotor or brake disc while that disc is still mounted on the wheel hub assembly. Either a hand crank system, or a motorized system may be utilized to provide horizontal movement of the tool holder carriage toward and away from the center of the brake disc or rotor during resurfacing.

5 Claims, 3 Drawing Sheets

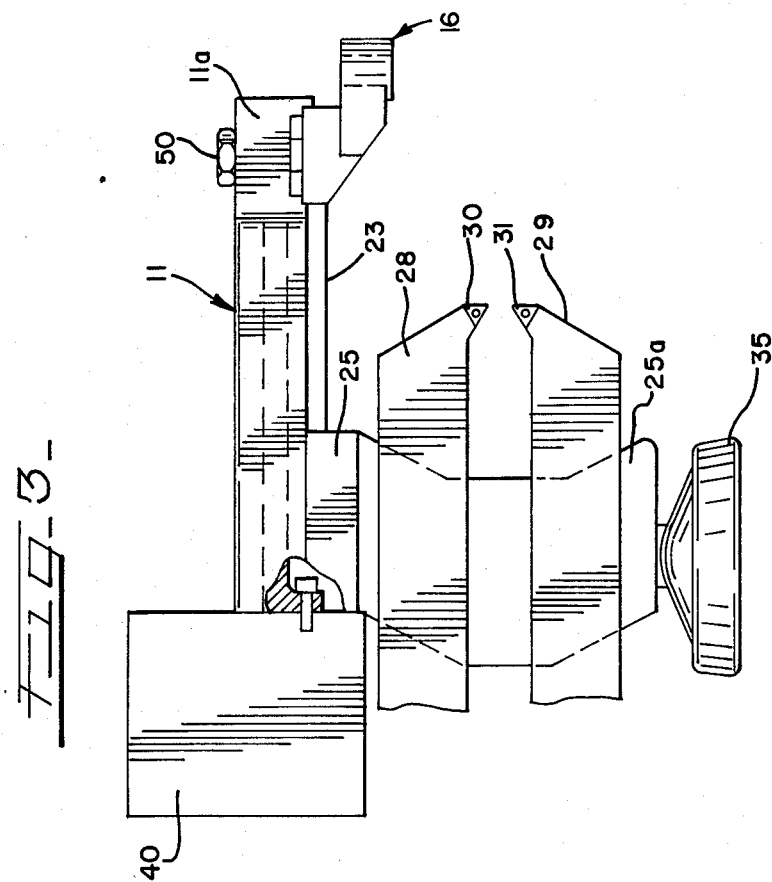
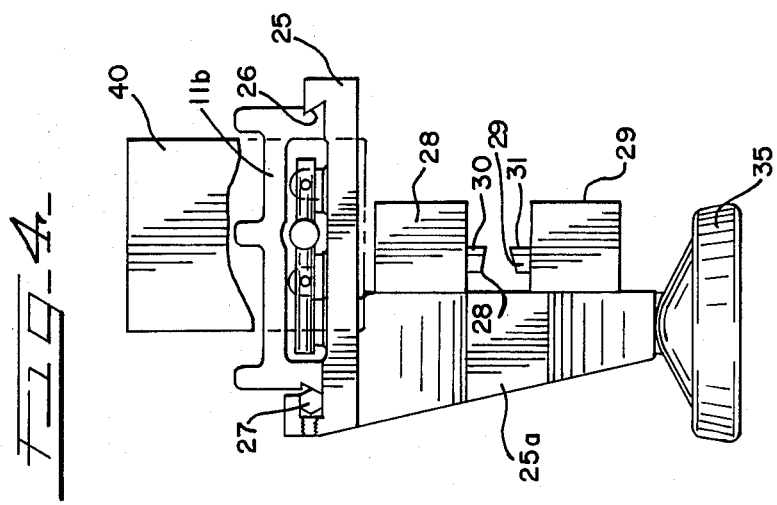

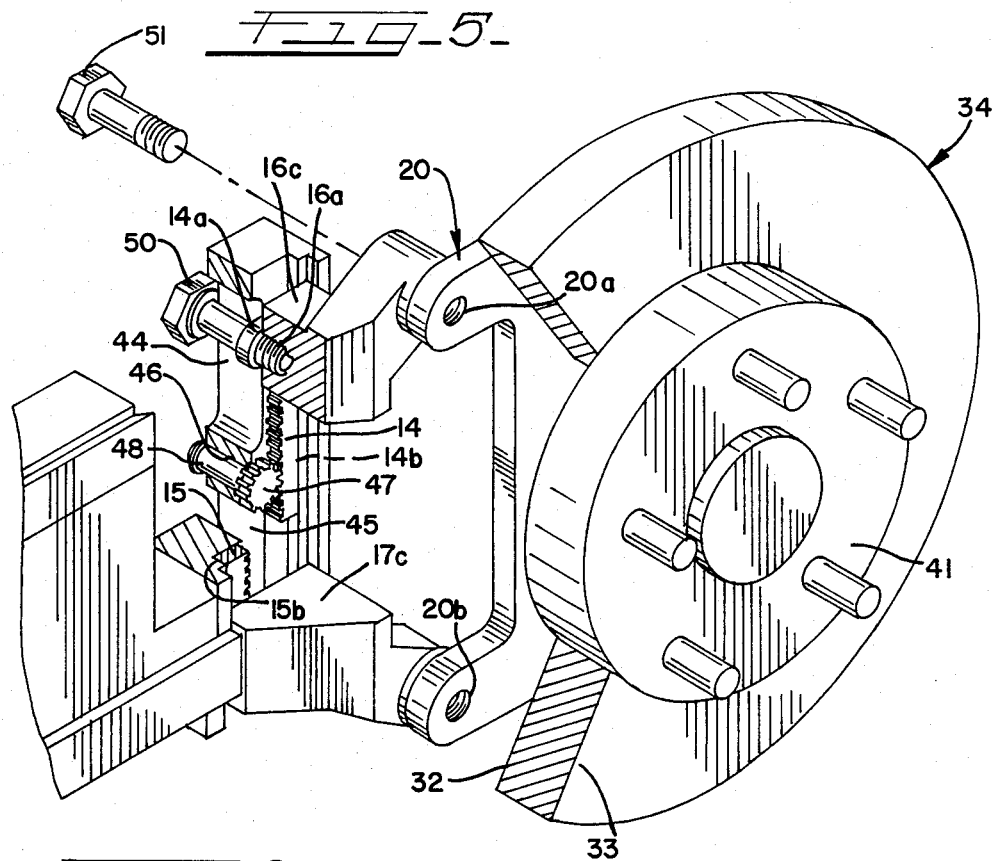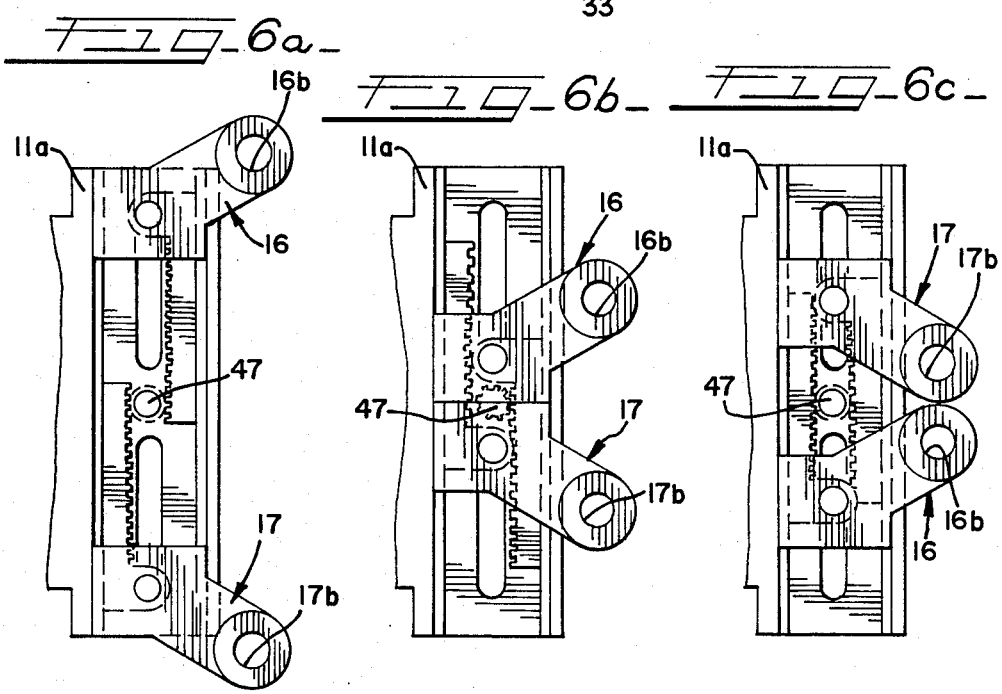

PORTABLE BRAKE DISC RESURFACING TOOL

BACKGROUND OF THE INVENTION

This invention relates to brake lathes for resurfacing automotive disc brakes, and more particularly, to a portable brake lathe which is mountable on a brake caliper mounting bracket of an automobile to resurface disc brakes adjacent thereto without removal of the discs from their mounted position on an automobile.

The first brake lathes utilized to resurface automotive brake discs for use with caliper or spot-type brakes were conversions of lathes originally meant for resurfacing the inner cylindrical surfaces of brake drums. Brake lathes originally designed to resurface the inside of brake drums were independent self standing lathes having a rotatable hub on which a brake drum could be mounted, and a tool support mounting for a single boring bar which was fed parallel to the axis of the hub but spaced therefrom a distance equal to the radial distance between the hub axis and the cylindrical drum contact surface. The addition of a tool support assembly for simultaneously removing metal from both sides of a brake disc mounted on the hub is shown in U.S. Pat. No. 3,626,793. The tool feed for an automobile brake disc resurfacer is perpendicular to the tool feed utilized for a brake drum resurfacer.

Typically, use of independent standing automotive brake lathes required removal of the brake disc from the wheel hub assembly so that the disc could be mounted on the brake lathe hub assembly. Removal of brake wheel discs requires the removal of the wheel and tire, and removal of the brake or spot caliper unit from its position surrounding a segment of the brake disc. This is accomplished by disconnecting the caliper unit from its mounting bracket which is a part of the wheel hub assembly and is positioned behind or inwardly of the removable brake disc on the hub assembly. Typically, brake caliper mounting brackets include a pair of distal arms extending from the wheel hub in a somewhat crescent shape and have apertures adjacent the distal ends thereof for mounting the brake caliper unit thereon. While some rotors or discs are fixed to the hub by bolts or the like, some rotors are mounted loosely on the hub over the wheel lug nuts so that tightening the wheel onto the hub retains the rotor in mounted position.

In order to avoid much of the work necessary to remove each wheel brake disc from the automobile in order to mount same to the independent standing brake lathe, small portable cutting tool support assemblies have been developed which mount to the brake caliper mounting bracket by means of adjustable and swingable links, or by means of a fixed non-adjustable mounting member, with both such mechanisms being shown in U.S. Pat. No. 4,388,846. The fixed non-adjustable mounting bracket tightly secures the tool support fixture to the brake caliper mounting bracket on the automobile for which the unit is designed to fit. However, with automobiles from around the world presently utilizing many varying brake systems, adjustable mounting systems are required to service automobiles having differing brake caliper mounting brackets. The use of swingable links for adjustably mounting the tool support fixture assembly onto a brake caliper mounting bracket provides the necessary adjustability for mounting the unit on differing brake caliper brackets, but the use of links which flop around when not properly tightened may allow the tool support assembly to be mounted on the brake calipers support bracket in a position other than optimum for the resurfacing procedure.

A need has developed to provide an improved assembly for mounting a dual brake disc resurfacing tool to the brake caliper mounting bracket on the hub of an automobile wheel. Such an assembly should provide adjustability of the mounting mechanism, while assuring balance and positive optimum mounting of the fixture on the brake caliper support brackets.

It is therefore an object of the invention, generally stated, to provide an improved mechanism for positively and adjustably mounting a dual brake disc resurfacing tool to the brake caliper mounting bracket of an automobile wheel hub assembly.

SUMMARY OF THE INVENTION

The invention is directed to a portable brake disc resurfacing tool which is adapted to be mounted on automobile brake caliper mounting bracket for resurfacing a brake disc adjacent the bracket without removing the disc from its mounted position on an automobile. The resurfacing tool includes a framework, adjustable means for mounting the framework on the brake caliper mounting bracket, and opposed dual cutting tools for cutting opposing surfaces on a brake disc. The tool additionally includes tool mounting means for selectably mounting the cutting bits thereon, and means for slidably mounting the tool mounting means on the framework. An improvement resides in an adjustable means for mounting the framework on the brake caliper mounting bracket. The improvement comprises a pair of opposed mounting arms with each arm including a distal end having a first aperture therethrough for aligned mounting with one of two apertures on a brake caliper mounting bracket. A base end of the mounting arm is spacially related from the distal end and includes a pair of opposing surfaces adapted to slidably mount the base end along a first channel on the framework. The improvement further includes means for adjustably fixedly securing each arm along the channel, and means for limiting the travel of one of the arms along the channel relative to the travel of the other of the arms along the channel.

BRIEF DESCRIPTION OF THE DRAWINGS

The features of the present invention, which are believed to be novel, are set forth with particularity in the appended claims. The invention may best be understood by reference to the following description taken in conjunction with the accompanying sheets of drawings, in the several features of which like reference numerals identify like elements, and in which:

FIG. 3 is a top plan view of the portable brake disc resurfacing tool fixture shown in FIG. 1;

FIG. 4 is an end elevational view of the portable brake disc resurfacing tool fixture;

FIG. 5 is a fragmentary enlarged detailed view, with portions shown in section, of the adjustable tool fixture mounting assembly as it appears when positioned adjacent a disc brake caliper mounting bracket;

FIG. 6a is an enlarged fragmentary detailed elevational view of the fixture mounting assembly of the present invention shown in fully extended position;

FIG. 6b is an enlarged fragmentary detailed elevational view similar to FIG. 6a with the tool fixture mounting assembly shown in standard minimum extension configuration; and FIG. 6c is a fragmentary enlarged detailed elevational view similar to FIGS. 6a and 6b wherein the fixture mounting arm and rack gears are reversed from their standard mounting to provide a minimum extension of the mounting arms.

DETAILED DESCRIPTION OF THE PREFERRED EMBODIMENT

Figure 1:
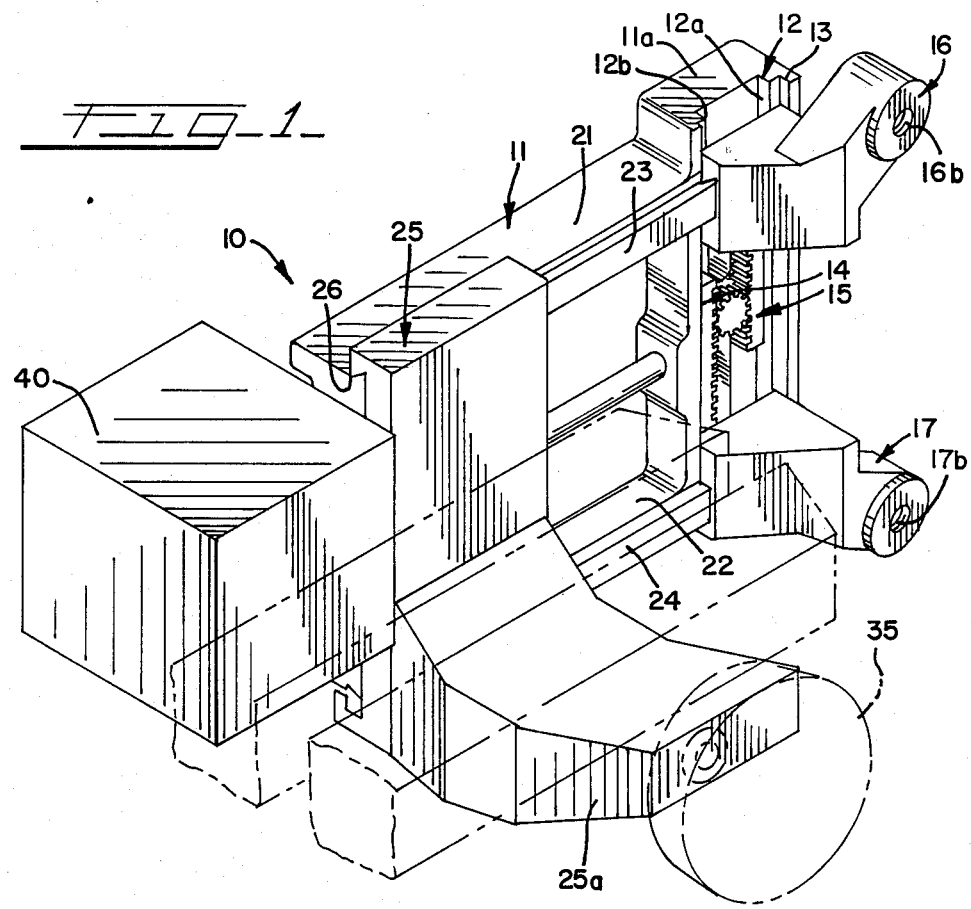
FIG. 1 is a perspective view of the portable brake disc resurfacing tool fixture constructed in accordance with the present invention with the cutting tools, tool holders, and tool support advancing wheel shown in broken line.

Referring to FIGS. 1-5, the portable brake lathe, generally indicated at 10, constructed in accordance with the present invention includes a generally rectangular frame 11 having at its right hand side a vertical end portion 11a including two vertical channels thereon, an inner deep channel 12, and a slightly larger coaxial outer shallower channel 13. The inner channel 12 is adapted to slidably retain therein a pair of rack gears 14, 15 and a pair of jaws 16-17 are sized to be slidably retained in the shallower outer channel 13. The right side of frame 11 including the channels 12-13 rack gears 14-15 and jaws 16-17 provide a strong, yet adjustable, mounting assembly for securing the portable brake lathe 10 onto a brake caliper mounting bracket, generally indicated at 20 in FIG. 5.

Frame 11 further includes a pair of space upper and lower frame rails 21-22, respectively, which extend horizontally between a right hand vertical frame portion 11a and a left hand frame end wall 11b (FIG. 4). Horizontal frame rails 21-22 each have integrally positioned thereon a longitudinal dove tail way 23, 24, respectively, which, when combined, are adapted to slidably receive a tool supporting carriage, generally indicated at 25, therealong.

Carriage 25 includes an upper dove tail way 26 adapted to ride on frame railway 23, and lower combination dove tail way and adjustable gib assembly 27 (FIG. 4) which assures proper sliding of the carriage longitudinally along the frame ways 23-24. Carriage 25 acts as a tool post and includes thereon adjustable means for retaining a pair of opposed tool holders 28-29. The tool holders in turn have mounted at their inner distal ends triangular tool bits 30-31, respectfully, which are adapted to engage and resurface the opposing sides 32, 33 of an automobile brake disc or rotor 34 (FIG. 5). A hand wheel 35, rotatably mounted on the base 25a of carriage 25 acts by means of a hand wheel shaft (not shown) through the bottom of carriage 25 to a pin wheel pinion 36 gearingly connected with an idler pinion 37 and in combination with a support pinion 38 to use the leadscrew 39 as a rack and provide appropriate sideways motion for the carriage 25 as the hand wheel 35 is turned.

Figure 2:
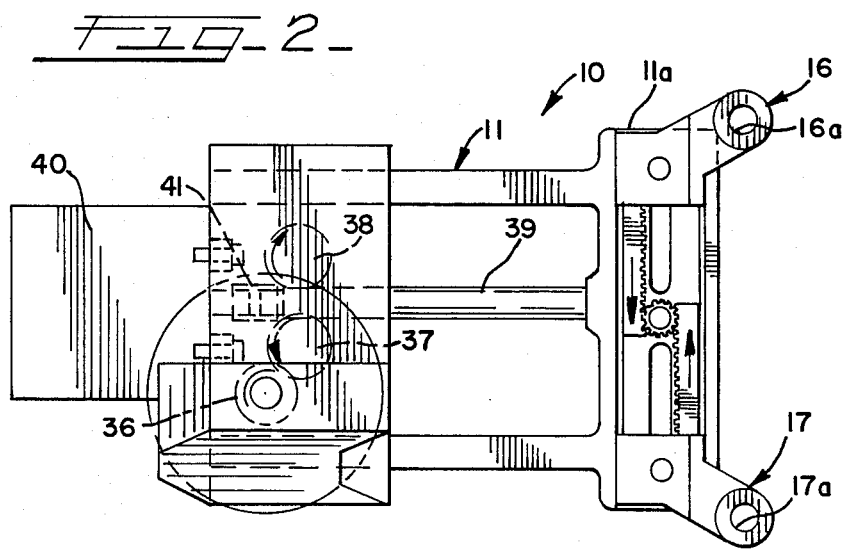
FIG. 2 is a front elevational view of the portable brake disc resurfacing tool fixture shown in FIG. 1 with the tools and tool supports eliminated, and the dual support assembly advancing wheel shown in broken line.

An additional means for moving the tool support carriage 25 along ways 23-24 may be achieved by a feed motor 40 mounted at the front of frame 11. The feed motor 40 is connected to the leadscrew 39 by a coupler 41 (FIG. 2). Power feed is achieved by locking the hand wheel 35 and its shaft (not shown) causing the idler pinion 37 to function as a nut for the leadscrew 39. Therefore, either the hand or motor feed may be utilized to run the cutting tools 30, 31 laterally parallel to the frame ways 23-24 so that those tools resurface both of the outer opposed surfaces 32, 33 (FIG. 5) of a typical brake disc 34 while that disc is mounted on the hub 41 of an automobile.

Referring to FIGS. 1, 2 and 5, the frame mounting assembly more particularly includes a pair of slots 44, 45 through the frame vertical end portion 11a spatially on either side of a central aperture 46 which provides a mounting for a rotatable pinion gear 47 and its mounting shaft 48 which is retained therein.

Additionally, a pair of retaining bolts 50-50 (only one shown) are each positioned to extend through one of the slots 44-45 from the back thereof through the slot and through one of the apertured lugs 14a-15a (one shown) of racks 14 and 15, respectively, and thereafter to be threadedly received in a threaded bore 16a-17a (one shown) extending into the back side of each of the jaws 16-17. Additionally, each jaw contains a bore inwardly adjacent the distal end of each jaw, bore 16b in jaw 16 and bore 17b in jaw 17, which is adapted to receive a threaded bolt, such as shown at 51, which extends through bore 16b and threads into a threaded mounting aperture 20a in the wheel hub brake mounting bracket 20.

The combination of the rectangular jaw bases 16c-17c moving vertically in outer channel 13 and the concurrently vertically moving gear racks 14 and 15 sliding in channel 12, all coordinatedly tied together by idler pinion 47 and bolts 50—50 which maintain the structural integrity of the assembly. The frame mounting assembly provides an adjustable and yet sturdy means for mounting the framework 11 of the portable brake lathe assembly 10 onto the mounting bracket 20 of an automobile wheel hub assembly.

It is understood that the mounting brackets such as at 20, of automobile wheel hub assemblies are not standardized, and may change in distance between the apertures 20a and 20b depending upon the make of the automobile, and the make of the brake caliper sub-assembly (not shown), if that sub-assembly is made by someone other than the manufacturer. The present invention provides for the accurate slidable movement of the jaws 16 and 17 along the outer channel 13 of the assembly right hand portion 11a of the frame 11. The rectangular bases 16c-17c maintain the jaws in proper angular relation with respect to the frame 11, while the connected opposing rack gears on either side of pinion 47 assure that the jaws 16 and 17 are equidistantly spaced from the center of frame and provide a balanced stability to the mounting assembly irrespective of the adjustable width between the jaw apertures 16b and 17b. As shown most clearly in FIG. 5, the rack members 14, 15 are slidably retained in the inner channel 12 by a combination of the bolts 50—50, in pinion 47, and the outer vertical surfaces 12a and 12b of channel 12 which restrains movement of the outward flat sides of each rack 14-15, respectively, in the channel.

As shown most clearly in FIGS. 6a, 6b and 6c, jaws 16 and 17 are complementary, i.e., they extend to the right at equal angles from the horizontal. FIG. 6a shows the jaws 16-17 in fully extended position for utmost distance between the mounting bores 16b-17b. FIG. 6b shows the jaws 16 and 17 positioned in the minimum distal relation between bores 16b and 17b with the mounting assembly in its normal configuration. However, FIG. 6c shows the assembly with the jaws reversed from that shown that FIG. 6b, i.e., so that jaw 17 is on top and jaw 16 is on the bottom. In the reversed position, the distal portions of the jaws can touch so that apertures 16b and 17b may be most closely positioned. This reversed jaw positioning provides additional adjustability between jaw apertures 16b and 17b while the equal extension of the jaws is still controlled by the pinion gear 47 and the associated rack gears 14-15. It should be noted that since the rack gears 14-15 and the jaws 16-17 are separate pieces, which may be joined by the bolts 50—50, the reversal of jaws 16 and 17 in channel 13 is easily accomplished by manual manipulation. Also, the resulting configuration shown in FIG. 6c has the same stability and strength as the configuration shown in FIG. 6a and FIG. 6b.

Thus, a new and improved portable brake disc resurfacing tool has been shown and described including an improved tool fixture mounting assembly which has improved adjustability and is ruggedly safe when secured to the brake caliper mounting bracket of an automobile wheel hub. It should be noted that in driven wheel assemblies, i.e., front wheel hub assemblies in front wheel drive vehicles, and rear wheel assemblies in rear wheel drive vehicles, that no external means for turning the brake discs are needed. In non-driven wheel assemblies, an external means for turning the brake disc is needed, and may be supplied by apparatus presently known in the art.

While one embodiment of the present invention has been shown and described, it is understood by those skilled in the art that changes and modifications may be made within the scope of the present invention. Therefore, the aim of the appended claims is to cover all such changes and modifications which fall within the true spirit and scope of the present invention.

The invention is claimed as follows:

1. In a portable brake disc resurfacing tool fixture adapted to be mounted on an automobile brake caliper mounting bracket for resurfacing a brake disc adjacent said bracket without removing the disc from its mounted position on an automobile, said resurfacing tool including:
   a framework, adjustable means for mounting said framework on a brake caliper mounting bracket, opposed dual cutting tools for cutting opposing surfaces on a brake disc, tool mounting means for selectably mounting said cutting tools thereon, and means for slidably mounting said tool mounting means on said framework,
   the improvement wherein said adjustable means for mounting said framework on said brake caliper mounting bracket comprises:
   a pair of opposed mounting arms, each arm including a first aperture therethrough adjacent a distal end thereof for aligned mounting with one of two apertures on a brake caliper mounting bracket, a base end spatially related from said distal end and including a pair of opposing surfaces adapted for slidably mounting said base end along a first channel on said framework, means for adjustably fixedly securing each said arm along said channel, and means for limiting the travel of one of said arms along said channel relative to the travel of the other of said arms along said channel.

2. The brake disc resurfacing tool as defined in claim 1 wherein said means for adjustably fixedly securing each said arm along said channel includes
   an elongate slot positioned on said framework between a pair of opposing parallel spaced surfaces defining said channel thereon, and bolt means extendable through said slot and threadedly securable on said arm for adjustably affixing said arm on said channel.

3. The brake disc resurfacing tool as defined in claim 2 wherein said means for limiting the travel of one of said arms relative the travel of the other of said arms include
   elongate first and second rack gears including an aperture through each for mounting each said gear on one of said bolt means, respectively, and
   a pinion gear rotatably mounted on said framework adjacent said slot between said opposed parallel spaced surfaces defining said channel thereon, and adapted for gear tooth engagement with each of said first and second rack gears.

4. The brake disc resurfacing tool as defined in claim 2 wherein each of said arms is reversably mountable on said channel for providing added adjustability to the spacing of said apertures adjacent each said arm distal end.

5. A portable brake disc resurfacing tool fixture adapted to be mounted on an automobile brake caliper mounting bracket for resurfacing a brake disc adjacent said bracket without removing the disc from its mounted position on an automobile, said resurfacing tool comprising:
   a framework, an adjustable means for mounting said framework on a brake caliper mounting bracket, including a pair of opposed mounting arms, each arm including a first aperture therethrough adjacent a distal end thereof for aligned mounting with one of two apertures on a brake caliper mounting bracket, a base end spatially related from said distal end and including a pair of opposing surfaces adapted for slidably mounting said base end along a first channel on said framework, each of said arms is reversably mountable on said channel for providing added adjustability to the spacing of said apertures adjacent each said arm distal end,
   a pair of elongate spatially related slots positioned on said framework between a pair of opposing parallel spaced surfaces defining said channel thereon, and a pair of bolts with one extendable through each said slot and threadedly securable on one of said arms for adjustably affixing each said arm on said channel,
   elongate first and second rack gears including an aperture through each for mounting each said rack on one of said bolts, and
   a pinion gear rotatably mounted on said framework adjacent said slots between said opposed parallel spaced surfaces defining said channel thereon, and adapted for gear tooth engagement with each of said first and second rack gears,
   a tool carriage horizontally slidably mounted on said framework, opposed dual tool mounting means selectably releasably mounted on said tool carriage, and a pair of triangular 12 point cutting tools, each mountable on one of said dual tool mounting means for cutting the opposing side surfaces on a brake disc.

* * * * *